United States Patent
Hanks

(10) Patent No.: US 10,744,725 B2
(45) Date of Patent: Aug. 18, 2020

(54) SUPPORT TOOLS FOR FORMING LAMINATES

(71) Applicant: The Boeing Company, Chicago, IL (US)

(72) Inventor: Dennis James Hanks, Enumclaw, WA (US)

(73) Assignee: The Boeing Company, Chicago, IL (US)

( * ) Notice: Subject to any disclaimer, the term of this patent is extended or adjusted under 35 U.S.C. 154(b) by 737 days.

(21) Appl. No.: 15/169,976

(22) Filed: Jun. 1, 2016

(65) Prior Publication Data

US 2017/0348919 A1 Dec. 7, 2017

(51) Int. Cl.
*B29C 70/34* (2006.01)
*B29L 31/00* (2006.01)

(52) U.S. Cl.
CPC ......... *B29C 70/34* (2013.01); *B29L 2031/757* (2013.01)

(58) Field of Classification Search
CPC ........... B21D 7/04; B21D 24/02; B21D 37/04
See application file for complete search history.

(56) References Cited

U.S. PATENT DOCUMENTS

| | | | | |
|---|---|---|---|---|
| 4,044,085 A * | 8/1977 | Grawey | ................. | B29D 30/08 156/118 |
| 4,726,924 A * | 2/1988 | Mittelstadt | ............... | B29B 15/08 156/180 |
| 5,201,909 A * | 4/1993 | Von Wyl | ............... | B22D 11/053 164/416 |
| 5,352,306 A * | 10/1994 | Grimshaw | ............ | B29C 70/388 156/189 |
| 6,458,308 B1 * | 10/2002 | Kato | ...................... | B29C 43/203 264/257 |
| 7,141,199 B2 * | 11/2006 | Sana | ...................... | B29C 70/345 264/255 |
| 7,527,759 B2 * | 5/2009 | Lee | ........................ | B29C 33/307 264/239 |
| 8,465,613 B2 * | 6/2013 | Rotter | .................... | B29C 70/462 156/212 |
| 8,827,252 B2 * | 9/2014 | Sauvestre | ............... | B29C 70/32 156/538 |
| 9,387,628 B2 * | 7/2016 | Chapman | .............. | B29C 70/462 |
| 9,782,937 B1 * | 10/2017 | Modin | .................. | B29C 70/388 |
| D807,933 S * | 1/2018 | Zermatten | .................... | D15/128 |

(Continued)

OTHER PUBLICATIONS

Wikipedia, "Leaf Spring," Retrieved Apr. 8, 2016, Wikipedia, https://en.wikipedia.org/wiki/Leaf_spring.

*Primary Examiner* — Jeffry H Aftergut
(74) *Attorney, Agent, or Firm* — Duft & Bornsen, PC

(57) ABSTRACT

Systems and methods are provided for utilizing support tools for forming laminates. One embodiment is a system that includes a pair of dies that hold a multi-layer laminate over a gap, a male die that presses the laminate into the gap causing the laminate to change shape, and a support tool inserted into the gap beneath the laminate. The support tool includes a base that extends in a lengthwise direction, struts fixedly attached to the base that project upward from the base and are distributed along the lengthwise direction, and a cap that is slidably attached to the struts, and that covers the struts to form an upper surface of the support tool. Each of the struts rises from the base to the cap.

20 Claims, 8 Drawing Sheets

(56) References Cited

U.S. PATENT DOCUMENTS

| | | | |
|---|---|---|---|
| 9,914,270 B2* | 3/2018 | Cruzado Parla | B29C 70/543 |
| 2006/0231981 A1* | 10/2006 | Lee | B29C 33/307 |
| | | | 264/320 |
| 2008/0040926 A1* | 2/2008 | Kismarton | B21D 13/02 |
| | | | 29/897.35 |
| 2011/0291325 A1* | 12/2011 | Mattia | B29C 70/462 |
| | | | 264/294 |
| 2013/0049258 A1* | 2/2013 | Rotter | B29C 70/462 |
| | | | 264/255 |
| 2015/0041048 A1* | 2/2015 | Anderson | B29C 70/38 |
| | | | 156/196 |
| 2016/0016366 A1* | 1/2016 | Robins | B29C 70/46 |
| | | | 425/356 |
| 2016/0121560 A1* | 5/2016 | Lee | B29C 70/443 |
| | | | 264/511 |

* cited by examiner

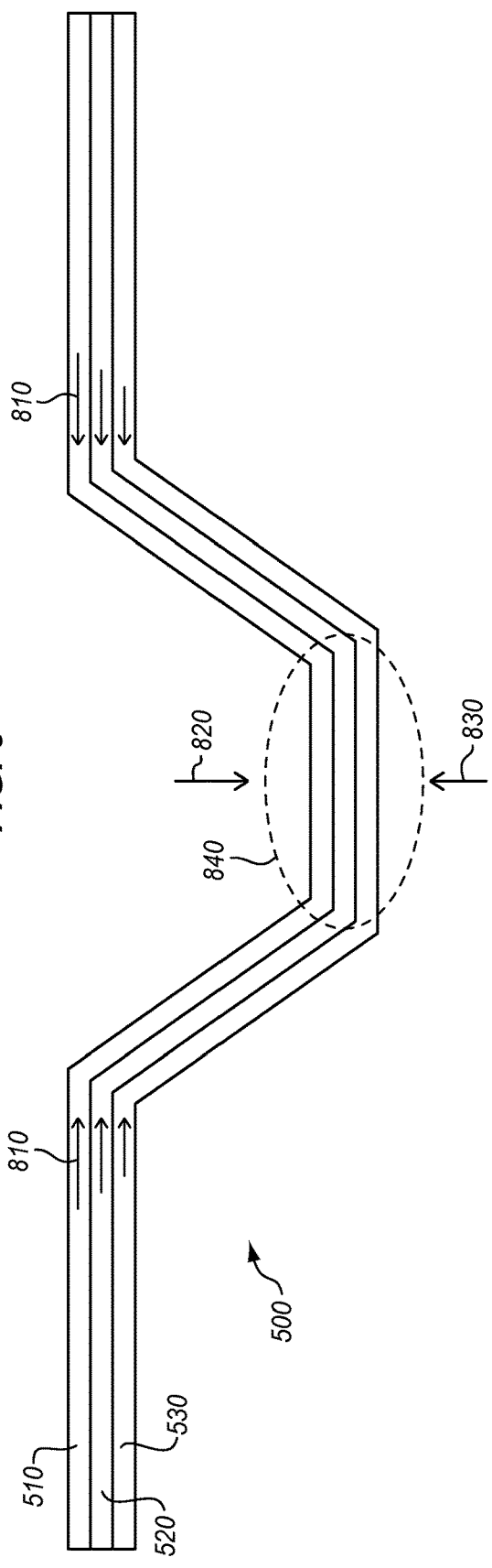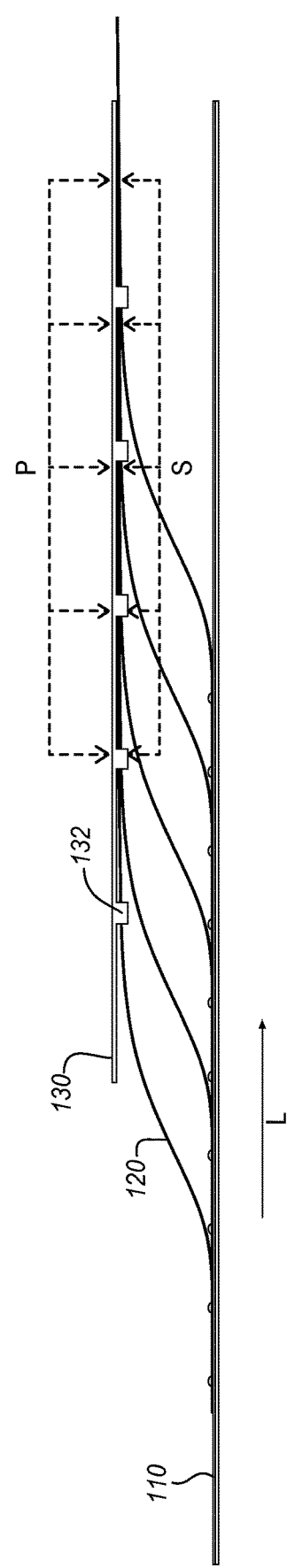

SUPPORT TOOLS FOR FORMING LAMINATES

FIELD

The disclosure relates to the field of fabrication, and in particular, to fabrication of composite parts from laminates of constituent material.

BACKGROUND

Multi-layer laminates of constituent material (e.g., carbon fiber) may be formed into any of a variety of shapes before they are cured into a composite part. For example, dies and/or other forming tools may be utilized to alter the shape of a sheet of laminate. Some sheets of laminate have been impregnated with a curable resin, and are referred to as "prepreg" laminate. After a sheet of prepreg laminate has been formed into a desired shape, it may be placed upon a curing tool and cured into a composite part. The curing tool ensures that the laminate does not deform or otherwise change shape during the curing process.

While forming tools remain useful for the purposes of shaping sheets of laminate, it remains difficult to effectively form multi-layer laminates into complex shapes without creating imperfections between the layers of the laminate. This is because the very act of forming the laminate may create interlaminar shear forces that result in the creation of out-of-tolerance imperfections (e.g., wrinkles). Thus, those who design composite parts continue to desire enhanced systems capable of shaping laminates in a cost-effective manner while also reducing the incidence and severity of out-of-tolerance imperfections.

SUMMARY

Embodiments described herein provide for dynamically responsive support tools for laminates. These support tools are capable of responding to pressure from a die that forms a laminate by generating an opposed force. This results in a pinching/squeezing action at the laminate that holds/presses layers of the laminate together during forming. This in turn enhances the ability of the laminate to resist interlaminar shear forces (and therefore prevent the formation of imperfections) during the forming process.

One embodiment is a system that includes a pair of dies that hold a multi-layer laminate over a gap, a male die that presses the laminate into the gap causing the laminate to change shape, and a support tool inserted into the gap beneath the laminate. The support tool includes a base that extends in a lengthwise direction, struts fixedly attached to the base that project upward from the base and are distributed along the lengthwise direction, and a cap that is slidably attached to the struts, and that covers the struts to form an upper surface of the support tool. Each of the struts rises from the base to the cap.

Another embodiment is an apparatus comprising a support tool that facilitates forming of a multi-layer laminate. The support tool includes a base that extends in a lengthwise direction, struts fixedly attached to the base that project upward from the base and are distributed along the lengthwise direction, and a cap that is slidably attached to the struts, and that covers the struts to form an upper surface of the support tool. Each of the struts rises from the base to the cap.

Another embodiment is a method of forming a laminate. The method includes locating a dynamic support beneath a multi-layer laminate at a location where a die will be pressed into the laminate, and altering the shape of the laminate by pressing the die into the laminate. The method also includes deforming the dynamic support in response to pressing the die into the laminate, and generating an opposed force to the die at the dynamic support. The method further includes removing the deformed dynamic support from beneath the laminate, and removing the die.

Another exemplary embodiment is a method. The method includes locating a dynamic support beneath a multi-layer laminate, pressing a die into the laminate, generating a gripping force that holds the laminate between the die and the dynamic support, and forming the laminate by tensioning the laminate over one or more corners while the dynamic support and the die maintain the grip.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 8 is a diagram illustrating forces applied to a multi-layer laminate during forming in an exemplary embodiment.

FIG. 9 is a diagram illustrating a dynamic support in a compressed shape in an exemplary embodiment.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
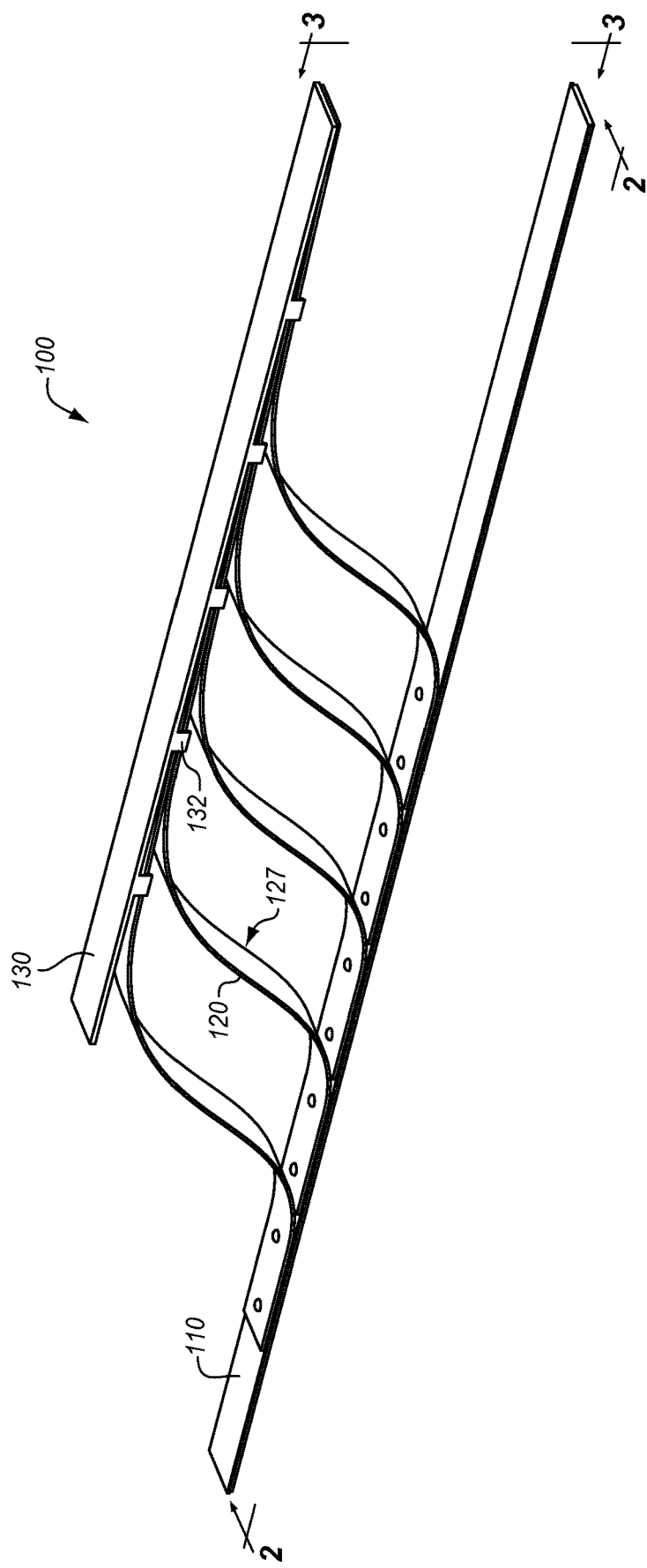
FIGS. 1-3 are diagrams illustrating a dynamic support in a resting shape for forming a laminate in an exemplary embodiment.
Figure 2:
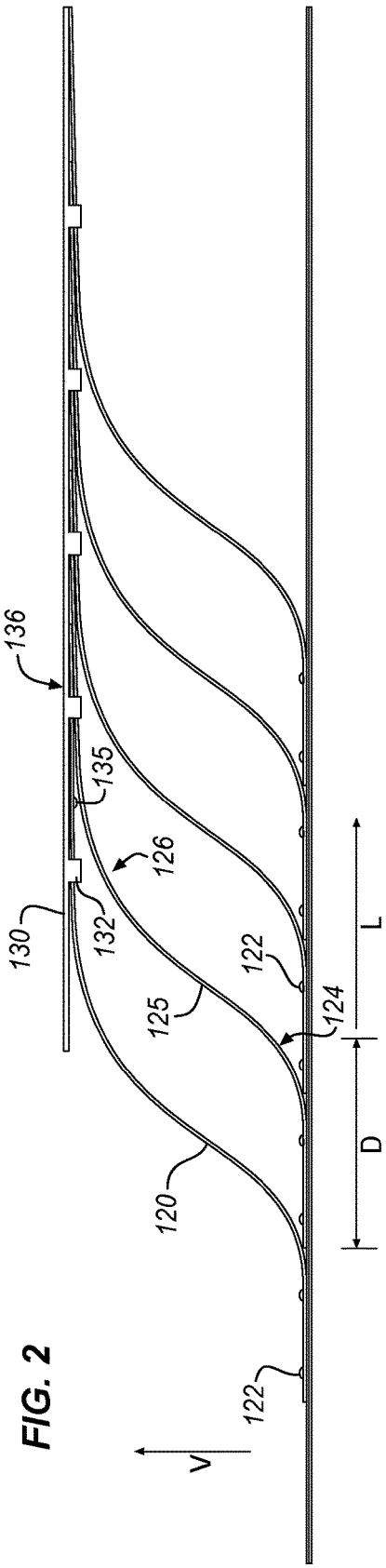
Figure 3:
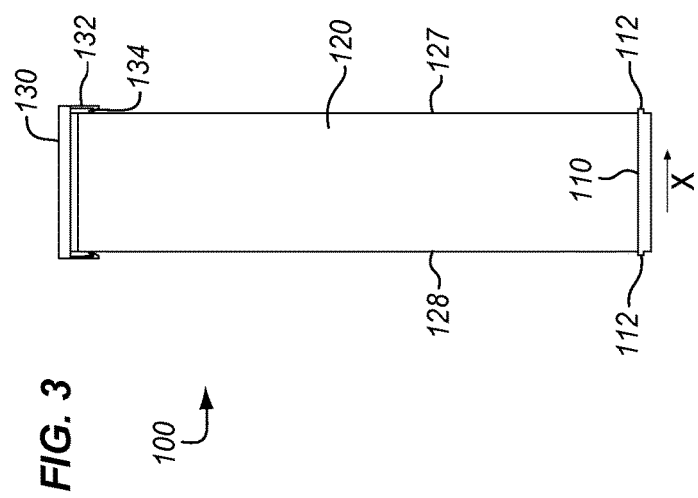

FIGS. 1-3 are diagrams of a dynamic support 100 in a resting state/shape in an exemplary embodiment. Dynamic support 100 comprises any system, device, or component operable to dynamically generate opposed force to a die (i.e., a forming tool) when the die applies force that changes the shape of a laminate. In this embodiment, dynamic support 100 comprises elongated base 110 from which flexible struts 120 extend, and cap 130 which covers struts 120. For the purposes of enhancing clarity, FIGS. 1-3 are first provided in order to fully illustrate dynamic support 100. Then, FIGS. 4-7 are provided to illustrate environments and systems in which dynamic support 100 may be utilized. Thus, discussion of the specific operations performed by dynamic support 100 is reserved until these later FIGS. are discussed.

FIG. 1 is a perspective view of dynamic support 100, while FIG. 2 is a side view indicated by view arrows 2 of FIG. 1, and FIG. 3 is a front view indicated by view arrows 3 of FIG. 1. As shown in these FIGS., base 110 is the structure to which each strut 120 is secured (e.g., fixedly attached) via fixation elements 122. Fixation elements 122 may comprise, for example, securement straps, spot welds, rivets, fasteners, or any suitable features for holding struts 120 in position with respect to base 110. In one embodiment, base 110 comprises a flexible, elastically deformable material (e.g., steel) that enables base 110 to conform to the shape of a curved/arced laminate. For example, in environments where large portions of an aircraft frame are formed as curved components, the flexibility of base 110 (and therefore support 100) may help to ensure that support 100 properly conforms to the laminate and applies pressure to the laminate uniformly.

Struts 120 extend/project in a vertical direction (V) from base 110. As shown in FIG. 2, each strut 120 has an edge 127 that forms a curve having a convex portion 124 (e.g., with respect to the vertical direction), an inflection point 125, and a concave portion 126. When viewed in a cross section and/or as shown in FIG. 2, this results in each strut 120 having an "S" shape that rises from base 110 to cap 130. The "S" shape may be formed such that it continues in the lengthwise direction without exceeding ninety degrees in slope (e.g., without overlapping itself in the vertical direction or forming an overhang). The shape helps struts 120 to generate spring forces in response to compression applied to support 100. Struts 120 may be formed, for example, from elastically deformable materials that are rigid, such as metal (e.g., steel, nitinol, etc.), plastic (e.g., reinforced or non-reinforced thermoplastic or thermoset blades), etc. As shown in FIG. 2, struts 120 may be distributed across base 110 in the lengthwise direction (L), and may for example be distributed uniformly at a distance (D) away from each other. In one embodiment, struts 120 overlap each other proximate to and just beneath cap 130. This ensures that forces applied by struts 120 to cap 130 are substantially uniform along the length of cap 130 when support 100 is compressed.

Cap 130 covers struts 120 and provides a uniform upper surface 136. Upper surface 136 will be placed into contact with a laminate during the forming process. Thus, when dynamic support 100 is deformed, flexed, and/or bent via pressure (P) applied to cap 130 (as shown in FIG. 9), resulting spring forces (S) from struts 120 will oppose this flexion (again, as shown in FIG. 9) by attempting to return support 100 from a compressed shape to its original resting shape, and will generate opposed forces which are transferred from cap 130 to the laminate. The opposed force/grip strength increases as the degree to which support 100 is compressed increases. Cap 130 also includes one or more flanges 132 that project downwards. As shown in FIG. 3, flanges 132 border edges 127 and 128 of each strut 120, limiting motion of cap 130 by preventing cap 130 (and/or struts 120) from laterally deflecting (i.e., moving in direction X) when support 100 is subjected to stress. That is, flanges 132 limit the motion of cap 130 perpendicular to the lengthwise direction. This feature is particularly useful to ensure the structural integrity of support 100, because struts 120 are not fixedly attached to cap 130, but rather are slidably constrained by flanges 132 of cap 130. This means that struts 120 may freely slide along the length (L) of cap 130 when support 100 is compressed. In some embodiments, one or more struts 120 are fixedly attached to cap 130 via fixation element 135 and base 110 via a fixation element 122. Meanwhile, other struts 120 remain slidably constrained by flanges 132 but otherwise capable of moving with respect to cap 130. Fixation element 135 may be implemented in a similar manner to fixation elements 122.

FIG. 3 further illustrates that in one embodiment, flanges 132 include angled tabs 134 and base 110 includes lips 112 which protrude laterally (i.e., in direction X). When support 100 is sufficiently compressed/deformed/flexed, angled tabs 134 are dimensioned to contact lips 112, deflect around lips 112, and lock into place to secure support 100 in its compressed/crushed/deformed state. This ensures that support 100 may be quickly and efficiently removed after the forming process has occurred for a laminate, and without damaging the laminate.

Figure 4:
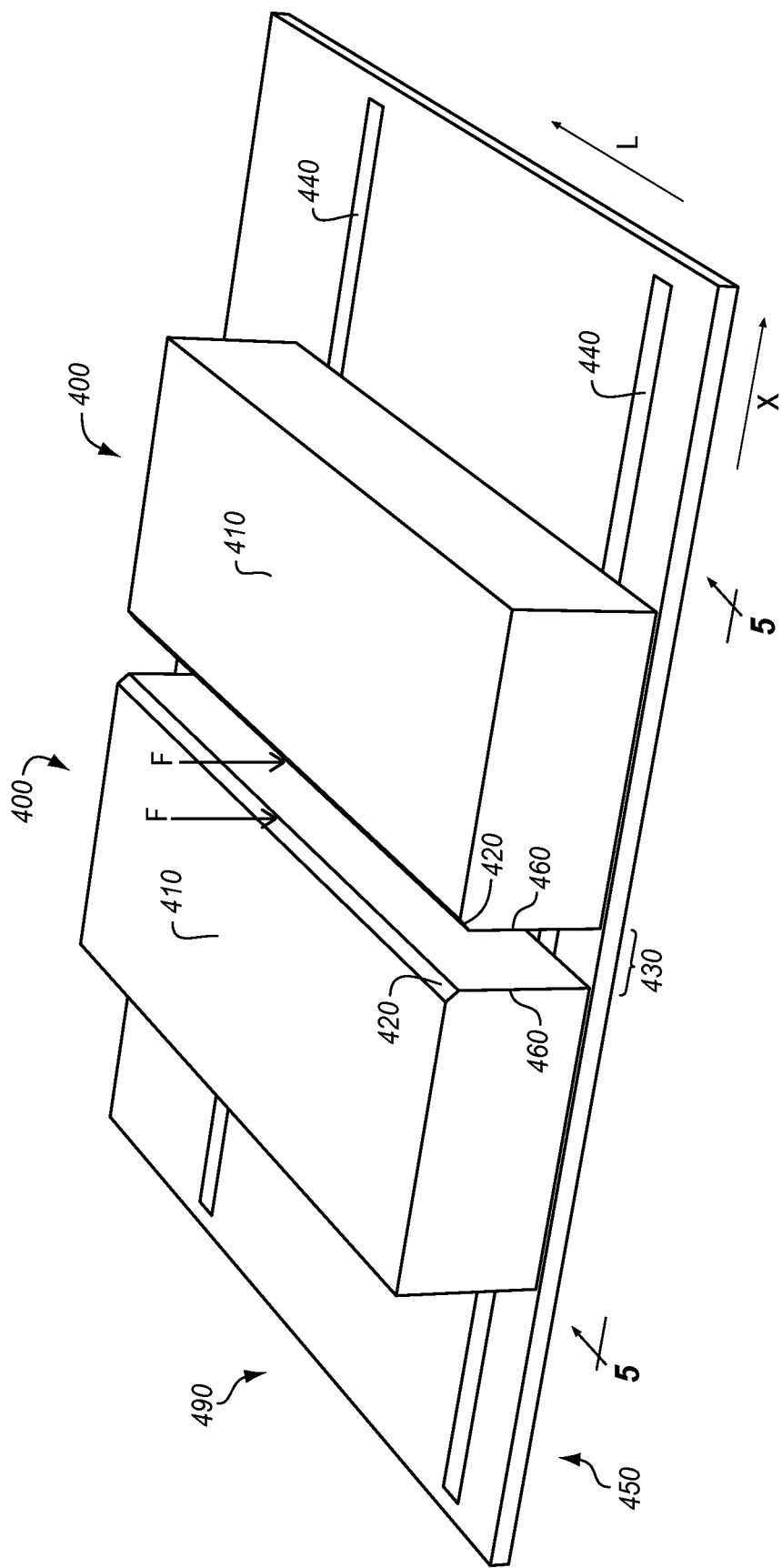
FIG. 4 is a diagram illustrating a pair of dies that move in combination with the dynamic support during forming of a laminate in an exemplary embodiment.

With support 100 having been described and detailed in the discussion above, the following figures and discussion will focus upon an exemplary fabrication system 490 in which support 100 may be used. FIG. 4 is a diagram illustrating a pair of dies 400 that move in combination with dynamic support 100 during forming of a laminate in an exemplary embodiment. As shown in FIG. 4, dies 400 each include upper surfaces 410 upon which a sheet of laminate (e.g., a "prepreg" sheet of laminate) may be laid. Dies 400 are separated by gap 430. Force F of FIG. 4 applied to dies 400 causes dies 400 to be driven apart from each other laterally, sliding dies 400 along tracks 440 to which dies 400 are mounted. That is, sides 460 of dies 400 move away from each other when corners 420 of dies 400 are driven apart, which has the effect of widening gap 430. During the forming process, support 100 is placed into gap 430, below where the laminate will be placed on top of dies 400. This enables support 100 to apply counterforce to a male die that will form the laminate into a desired shape.

Figure 5:
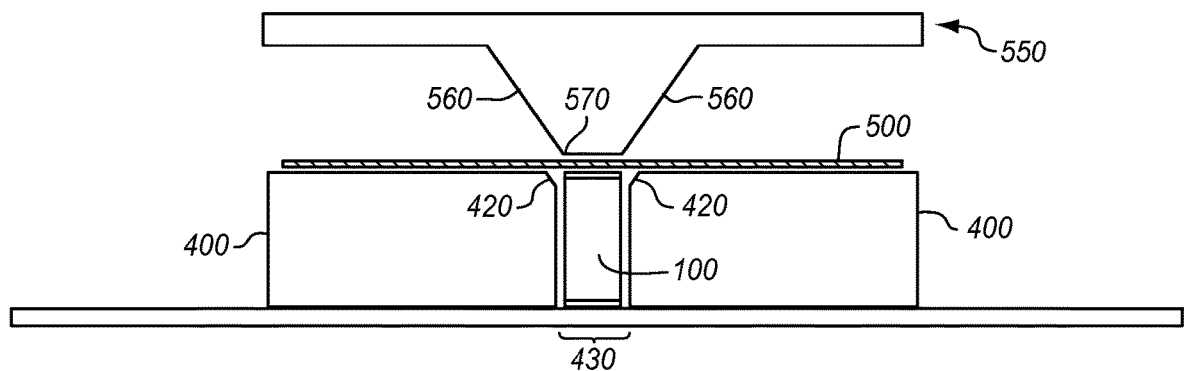
FIGS. 5-7 are diagrams illustrating a laminate being formed in an exemplary embodiment.
Figure 6:
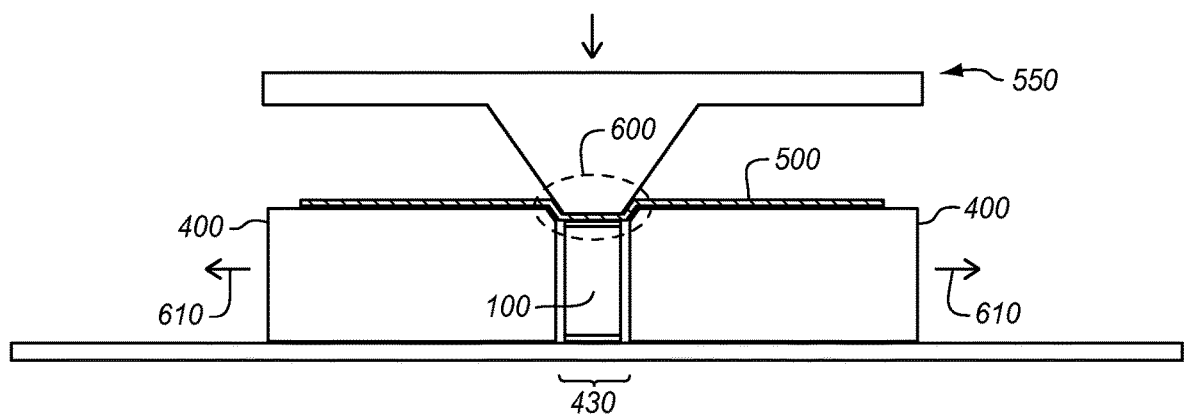
Figure 7:
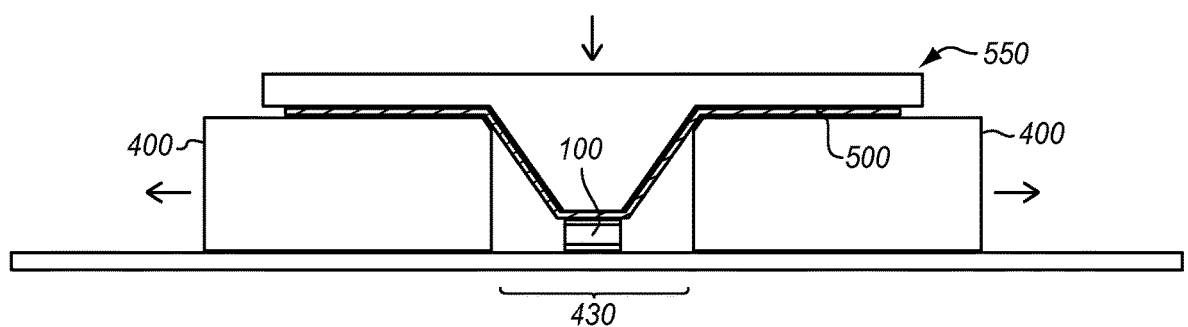

FIGS. 5-7 are diagrams illustrating a laminate being formed in an exemplary embodiment, according to the view indicated by view arrows 5 of FIG. 4. As shown in FIG. 5, laminate 500 is placed atop dies 400, and will be pressed/formed downward by male die 550. In this embodiment, male die 550 includes an initial contact surface 570, and angled faces 560. Angled faces 560 engage in sliding contact with corners 420 as male die 550 is pressed downward, which enables downward force applied via male die 550 to translate into lateral forces 610 that drive dies 400 apart and increase the size of gap 430. Support 100 is placed within gap 430, and supports laminate 500. In one embodiment, support 100 is sized to match the dimensions of initial contact surface 570. As male die 550 is driven downward as shown in FIGS. 6 and 7, laminate 500 is formed at region 600 and pressed into gap 430. Within region 600, support 100 is deflected/flexed/compressed downward, resulting in the generation of spring forces that resist the downward motion of male die 550 and are opposed to male die 550.

FIG. 8 is a diagram illustrating forces applied to a multi-layer laminate 500 during forming in an exemplary embodiment. Here, force 820 (e.g., applied by male die 550 of FIG. 7) presses layers 510, 520, and 530 of laminate 500 downwards. This results in interlaminar shear forces 810 which, if they exceed a threshold amount, may cause the creation of an imperfection in between layers. To address this concern, counterforce 830 is applied (e.g., by support 100 as shown in FIG. 7) in the opposite direction of force 820. Counterforce 830 may not entirely compensate force for 820 to prevent motion of male die 550, but rather may cause laminate 500 to become pinched/squeezed together in region 840. This increases the ability of laminate 500 to resist interlaminar shear forces 810 as laminate 500 is formed by die 550. Thus, dynamic support 100 enables better control of interlaminar shear.

FIG. 9 is a diagram illustrating a compressed dynamic support 100 in an exemplary embodiment. As shown in FIG. 9, each strut 120 bears compression by deflecting in the lengthwise direction and sliding with respect to cap 130 (i.e., in the lengthwise direction). Cap 130 is capable of remaining in position without deflecting in the lengthwise direction during compression, because struts 120 slide with respect to cap 130 during compression. Meanwhile, because most compression of support 100 results in lengthwise deflection of struts 120, each strut 120 remains capable of bearing a substantial amount of compression of support 100 without failing or reaching levels of plastic/permanent deformation. This is true even in circumstances where support 100 is compressed to a quarter of its current height.

Illustrative details of the operation of support 100 will be discussed with regard to FIG. 10. Assume, for this embodiment, that laminate 500 has been placed onto dies 400, and that male die 550 is ready to initiate forming of laminate 500 into a desired shape.

Figure 10:
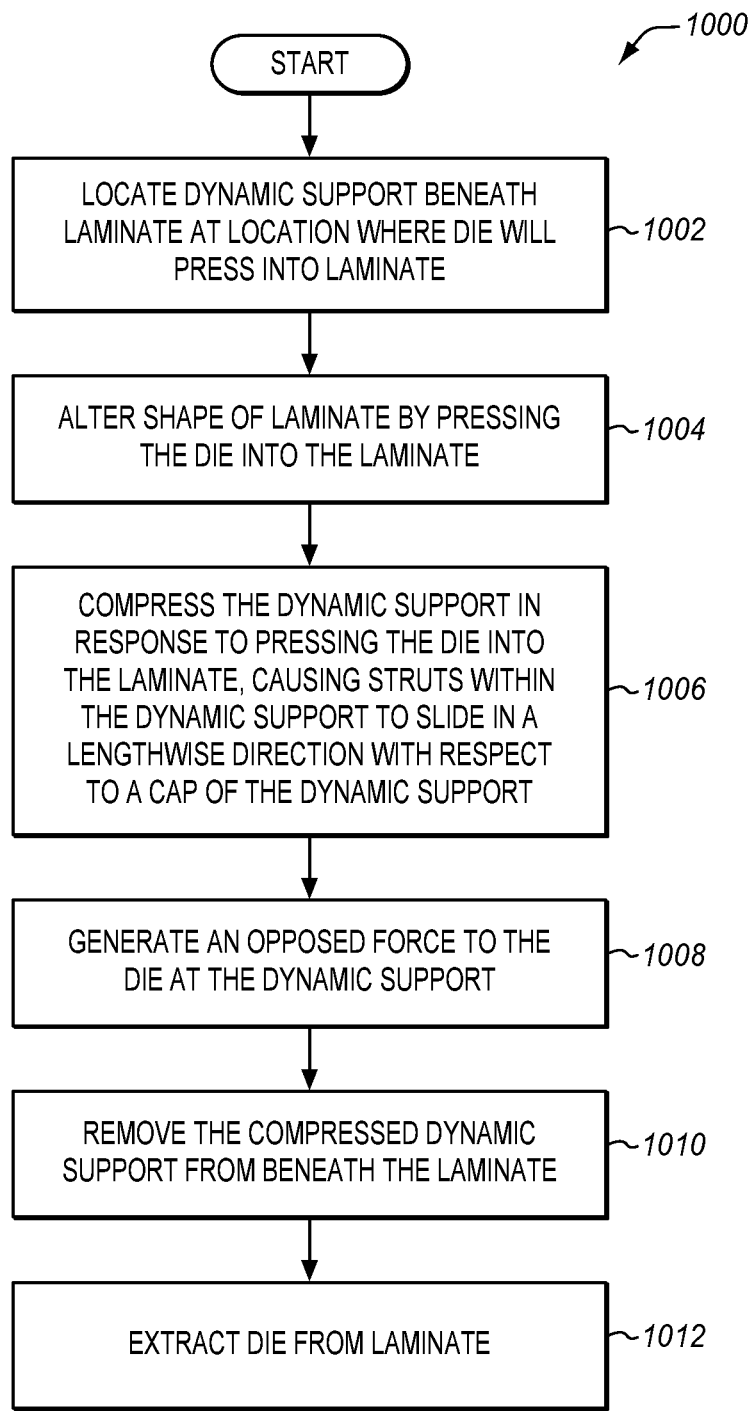
FIG. 10 is a flowchart illustrating a method for utilizing a dynamic support in an exemplary embodiment.

FIG. 10 is a flowchart illustrating a method 1000 for utilizing a dynamic support in an exemplary embodiment. The steps of method 1000 are described with reference to support 100 of FIG. 1, but those skilled in the art will appreciate that method 1000 may be performed in other systems and with other suitable dynamic supports as desired. The steps of the flowcharts described herein are not all inclusive and may include other steps not shown. The steps described herein may also be performed in an alternative order.

To prepare fabrication system 490 for forming laminate 500, support 100 is located/placed beneath laminate 500 at a location (e.g., gap 430) where male die 550 will press into laminate 500 (step 1002). This enables support 100 to resist incoming forces from die 550. Support 100 may be inserted into gap 430 before laminate 500 is laid atop dies 400, or may be inserted underneath laminate 500 after laminate 500 is laid-up.

Die 550 is driven downward to press into laminate 500, which alters the shape of laminate 500 by tensioning laminate 500 around one or more corners (e.g., corners 420) (step 1004). In this embodiment, die 550 forces laminate 500 into an inverted hat shape, and the size of the inverted hat shape increases as die 550 is driven further downward. In response to pressing die 550 into laminate 500, support 100 compresses/deforms, causing struts 120 within dynamic support 100 to slide in a lengthwise direction with respect to a cap 130 of dynamic support 100 (step 1006). This causes support 100 to generate an opposed gripping force to die 550 (step 1008), which effectively pinches/holds laminate 500 in a grip between support 100 and die 550 against die 500 in region 600 as laminate 500 continues to be shaped/formed by die 550. This in turn increases the ability of laminate 500 to resist interlaminar shear forces 810 of FIG. 8, which prevents imperfections (e.g., wrinkles) from being created during the forming process. After forming has completed, support 100 is removed from beneath laminate 500 (e.g., by sliding out of gap 430) (step 1010), and die 550 is extracted from laminate 500 (e.g., by raising die 550 upward) (step 1012). Laminate 500 may then be transferred to a cure tool (not shown) for curing into a composite part, and a new laminate 500 may be prepared for forming.

Utilizing method 1000 provides a substantial benefit over prior techniques, because method 1000 ensures that laminate 500 is squeezed in a manner that increases its ability to resist interlaminar shear, thereby preventing the formation of out-of-tolerance imperfections (e.g., wrinkles) between layers. This in turn increases the ability of laminate 500 to resist/prevent imperfections during the forming process, which beneficially enhances the quality of the resulting composite part.

Examples

In the following examples, additional processes, systems, and methods are described in the context of a fabrication system for composite parts. Assume, for this embodiment, that the composite parts comprise stringers for an aircraft, that extend for tens of feet lengthwise, but that have a cross-sectional length of only a few inches. In this example, dynamic support 100 is only two inches tall, and that compresses down to half an inch tall, but is tens of feet long. The distance between individual struts within support 100 is only one inch.

Figure 11:
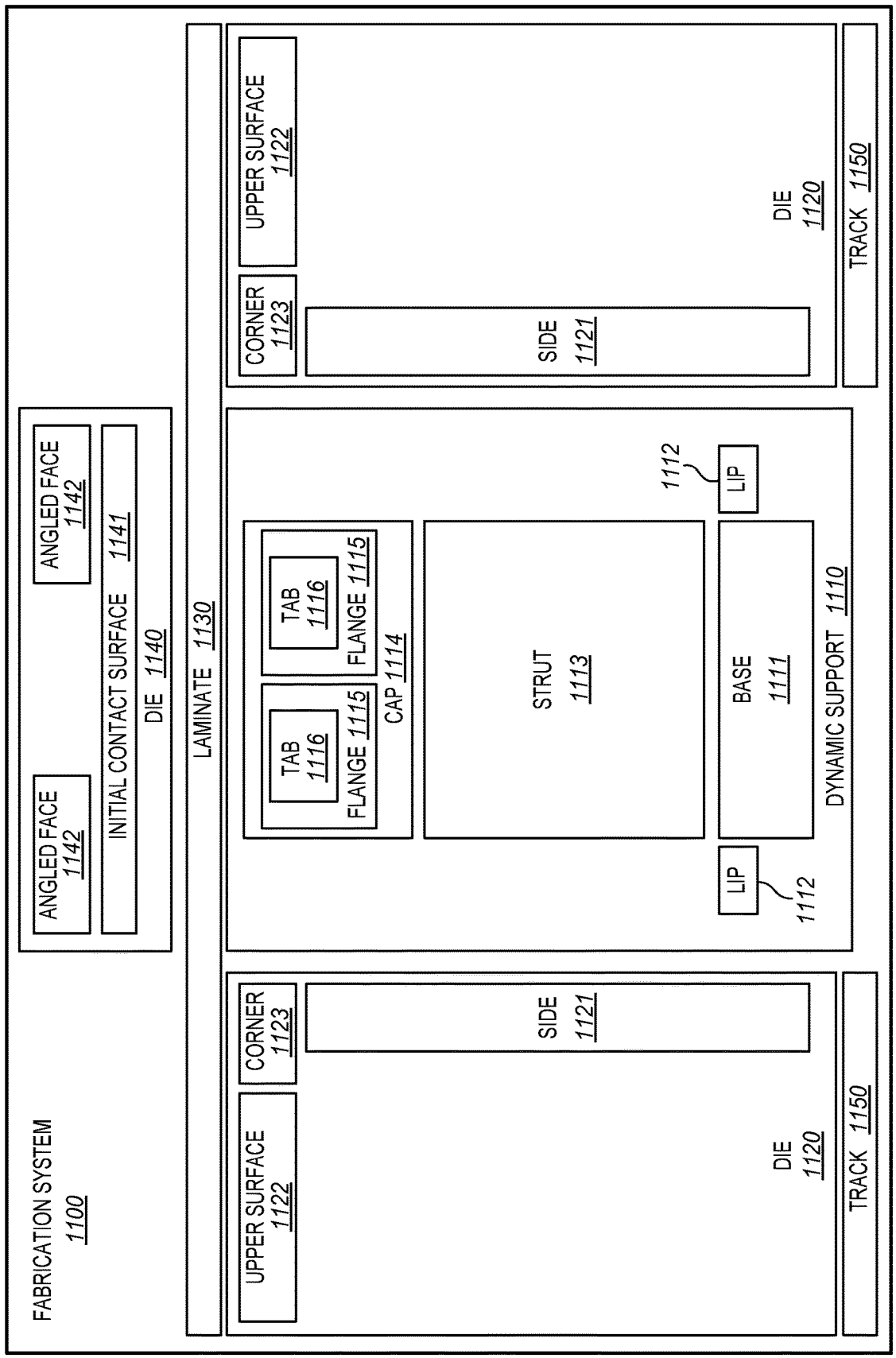
FIG. 11 is a block diagram of a fabrication system for laminates in an exemplary embodiment.

FIG. 11 is a block diagram of a fabrication system 1100 in an exemplary embodiment. According to FIG. 11, fabrication system 1100 includes dynamic support 1110, dies 1120, laminate 1130, and die 1140. Dynamic support 1110 is located between dies 1120, and includes base 1111, from which lips 1112 project. Support 1110 further includes at least one strut 1113 that is capable of generating opposed force in response to compression of support 1110, and a cap 1114 atop strut 1113. Cap 1114 includes multiple flanges 1115 which limit the lateral motion of cap 1114 with respect to strut 1113. Each flange 1115 also includes a tab 1116 dimensioned to mate with a corresponding lip 1112. Dies 1120 are located on either side of support 1110. Dies 1120 include side 1121, corner 1123, and upper surface 1122, which receives laminate 1130. Laminate 1130 comprises any suitable laminate, such as a multi-layer carbon fiber laminate comprising individual layers in which the fibers are arranged in different orientations.

Die 1140 presses into laminate 1130 to form laminate 1130 (e.g., at 15 pounds per square inch of pressure). Die 1140 includes initial contact surface 1141, and angled faces 1142, which engage in sliding contact with corners 1123 when die 1140 is pressed downward. Tracks 1150 enable dies 1120 to slide apart when die 1140 is pressed downward.

Figure 12:
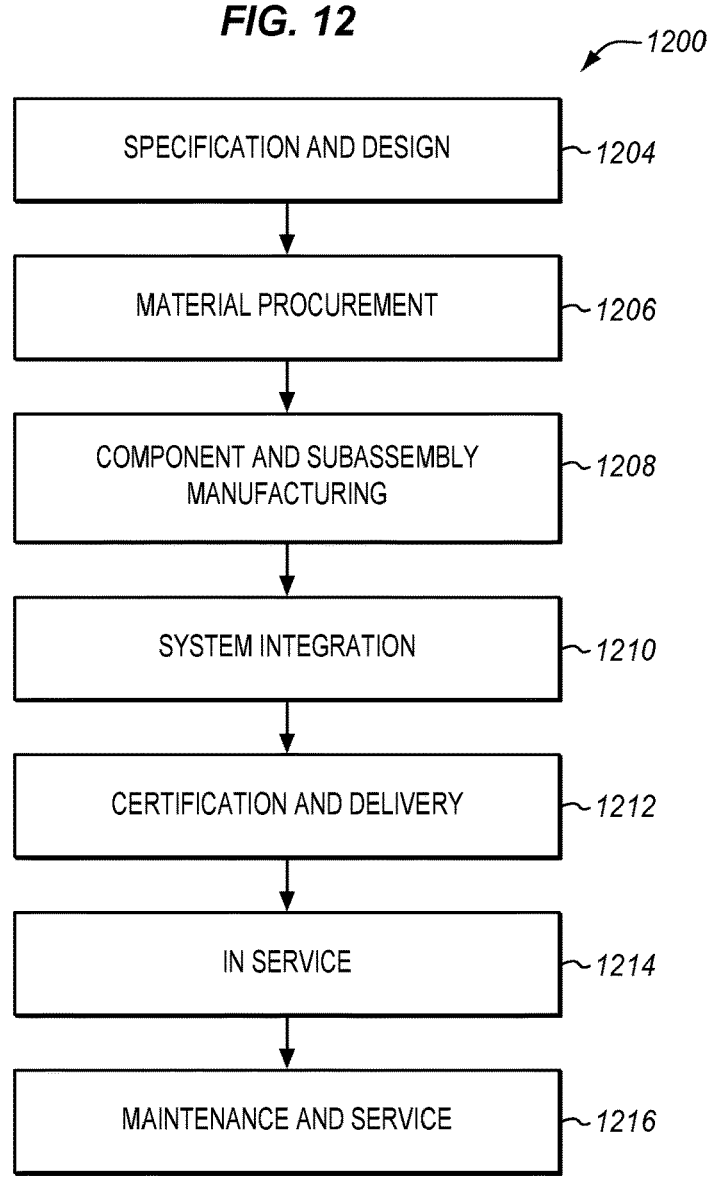
FIG. 12 is a flow diagram of aircraft production and service methodology in an exemplary embodiment.
Figure 13:
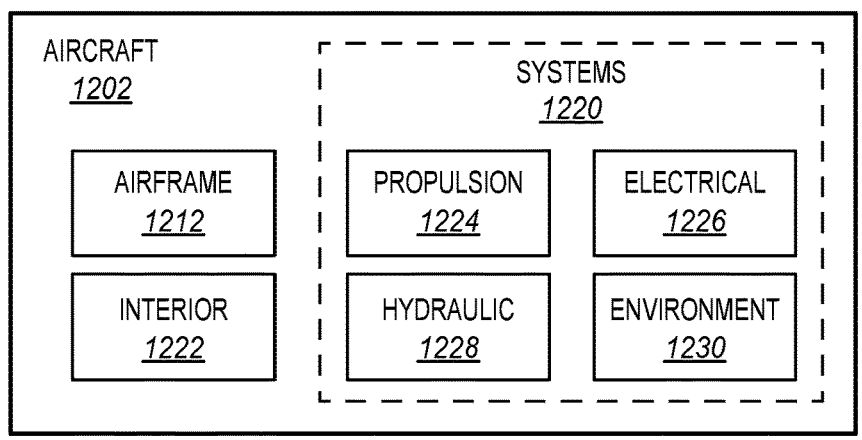
FIG. 13 is a block diagram of an aircraft in an exemplary embodiment.

Referring more particularly to the drawings, embodiments of the disclosure may be described in the context of an aircraft manufacturing and service method 1200 as shown in FIG. 12 and an aircraft 1202 as shown in FIG. 13. During pre-production, exemplary method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine maintenance and service 1216 (which may also include modification, reconfiguration, refurbishment, and so on).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 1202 produced by exemplary method 1200 may include an airframe 1218 with a plurality of systems 1220 and an interior 1222. Examples of high-level systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

Apparatus and methods embodied herein may be employed during any one or more of the stages of the production and service method 1200. For example, components or subassemblies corresponding to production stage 1208 may be fabricated or manufactured in a manner similar to components or subassemblies produced while the aircraft 1202 is in service. Also, one or more apparatus embodiments, method embodiments, or a combination thereof may be utilized during the production stages 1208 and 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation, to maintenance and service 1216. For example, the techniques and systems described herein may be used for steps 1206, 1208, 1210, 1214, and/or 1216, and/or may be used for airframe 1218 and/or interior 1222. These techniques and systems may even be utilized for systems 1220, including for example propulsion 12 24, electrical 1226, hydraulic 1228, and/or environmental 1230.

In one embodiment, laminate 500 is cured into a composite part that comprises a portion of airframe 118, and is manufactured during component and subassembly manufacturing 1208 by use of dynamic support 100. The composite part may then be assembled into an aircraft in system integration 1210, and then be utilized in service 1214 until wear renders the composite part unusable. Then, in maintenance and service 1216, the composite part may be discarded and replaced with a newly manufactured part. Dynamic support 100 may be utilized throughout component and subassembly manufacturing 1208 in order to form laminate 500 into desired shapes while preventing the creation of imperfections.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. A method comprising:
locating a dynamic support beneath a multi-layer laminate at a location where a die will be pressed into the laminate;
altering a shape of the laminate by pressing the die into the laminate;
elastically deforming S-shaped springs of the dynamic support in response to pressing the die into the laminate, thereby sliding the S-shaped springs against a cap of the dynamic support that contacts the laminate;
generating an opposed force to the die at the dynamic support;
removing the compressed dynamic support from beneath the laminate; and
removing the die.

2. The method of claim 1 further comprising:
retaining the S-shaped springs via flanges at the cap as the S-shaped springs slide.

3. The method of claim 1 wherein:
generating the opposed force results in the laminate being squeezed between the die and the dynamic support.

4. The method of claim 1 wherein:
elastically deforming the dynamic support comprises altering a shape of the dynamic support.

5. The method of claim 1 wherein:
generating the opposed force comprises generating a spring force opposed to compression of the dynamic support within the support.

6. The method of claim 1 further comprising:
laying the laminate onto a second die before altering the shape of the laminate; and
sliding the second die along a track in response to pressing the die into the laminate.

7. The method of claim 1 further comprising:
locking the dynamic support into the compressed shape.

8. The method of claim 1 wherein:
the opposed force increases as the dynamic support is further deformed.

9. The method of claim 1 further comprising:
laying up the multi-layer laminate.

10. The method of claim 1 wherein:
the laminate comprises Carbon Fiber Reinforced Polymer (CFRP).

11. The method of claim 1 further comprising:
transferring the laminate to a cure tool.

12. The method of claim 1 further comprising:
hardening the laminate into a composite part.

13. The method of claim 1 wherein:
the laminate corresponds with a portion of an aircraft.

14. The method of claim 1 wherein:
the die comprises a male die.

15. The method of claim 1 wherein:
the laminate comprises individual layers in which the fibers are arranged in different orientations.

16. A method comprising:
locating a dynamic support beneath a multi-layer laminate;
pressing a die into the laminate, causing S-shaped springs of the dynamic support to elastically deform, thereby sliding the S-shaped springs against a cap of the dynamic support that contacts the laminate;
generating a gripping force that holds the laminate between the die and the dynamic support; and
forming the laminate by tensioning the laminate over one or more corners while the dynamic support and the die maintain the grip.

17. The method of claim 16, wherein:
the gripping force is generated by deforming the dynamic support in response to pressing the die into the laminate.

18. The method of claim 16, further comprising:
retaining the S-shaped springs via flanges at the cap as the S-shaped springs slide.

19. The method of claim 18, wherein:
the flanges limit motion perpendicular to the lengthwise direction.

20. The method of claim 16, further comprising:
increasing the gripping force as forming of the laminate continues.

* * * * *